United States Patent
van Oort et al.

(10) Patent No.: US 9,957,434 B2
(45) Date of Patent: May 1, 2018

(54) CEMENTITIOUS COMPOSITIONS COMPRISING A NON-AQUEOUS FLUID AND AN ALKALI-ACTIVATED MATERIAL

(71) Applicant: Board of Regents, The University of Texas System, Austin, TX (US)

(72) Inventors: Eric van Oort, Bee Cave, TX (US); Katherine Louise Aughenbaugh, Austin, TX (US); Sriramya Duddukuri Nair, Austin, TX (US); Xiangyu Liu, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days. days.

(21) Appl. No.: 15/355,586

(22) Filed: Nov. 18, 2016

(65) Prior Publication Data

US 2017/0137694 A1 May 18, 2017

Related U.S. Application Data

(60) Provisional application No. 62/256,945, filed on Nov. 18, 2015.

(51) Int. Cl.

| | |
|---|---|
| *E21B 33/14* | (2006.01) |
| *E21B 33/16* | (2006.01) |
| *C09K 8/42* | (2006.01) |
| *C04B 12/00* | (2006.01) |
| *C04B 22/00* | (2006.01) |
| *C04B 24/08* | (2006.01) |
| *C09K 8/487* | (2006.01) |
| *E21B 21/00* | (2006.01) |
| *E21B 33/138* | (2006.01) |
| *C04B 28/00* | (2006.01) |
| *C04B 28/08* | (2006.01) |
| *C04B 28/18* | (2006.01) |
| *C09K 8/46* | (2006.01) |
| *C09K 8/32* | (2006.01) |
| *C09K 8/502* | (2006.01) |
| *C04B 103/00* | (2006.01) |
| *C04B 103/10* | (2006.01) |

(52) U.S. Cl.
CPC .............. *C09K 8/42* (2013.01); *C04B 12/005* (2013.01); *C04B 22/00* (2013.01); *C04B 24/08* (2013.01); *C04B 28/006* (2013.01); *C04B 28/08* (2013.01); *C04B 28/18* (2013.01); *C09K 8/32* (2013.01); *C09K 8/46* (2013.01); *C09K 8/487* (2013.01); *C09K 8/502* (2013.01); *E21B 21/003* (2013.01); *E21B 33/138* (2013.01); *C04B 2103/0093* (2013.01); *C04B 2103/10* (2013.01); *C09K 2208/02* (2013.01); *Y02P 40/165* (2015.11); *Y02W 30/92* (2015.05); *Y02W 30/94* (2015.05)

(58) Field of Classification Search
CPC ......... C04B 28/08; C04B 22/062; C09K 8/46; C09K 8/14; E21B 33/14; E21B 33/16
See application file for complete search history.

(56) References Cited

U.S. PATENT DOCUMENTS

| | | | |
|---|---|---|---|
| 2,801,077 | A | 7/1957 | Howard et al. |
| 4,349,389 | A | 9/1982 | Schofield et al. |
| 5,058,679 | A | 10/1991 | Cowan et al. |
| 5,585,333 | A | 12/1996 | Dahl et al. |
| 7,575,055 | B2 | 8/2009 | Reddy et al. |
| 2012/0258893 | A1 | 10/2012 | Deville et al. |
| 2014/0076568 | A1* | 3/2014 | McDonald .............. C01B 33/26 166/305.1 |

FOREIGN PATENT DOCUMENTS

| | | |
|---|---|---|
| WO | 2016003289 A1 | 1/2016 |
| WO | 2016032341 A1 | 3/2016 |

OTHER PUBLICATIONS

International Search Report and Written Opinion issued in PCT/US16/62746, dated Feb. 7, 2017.
Khalifeh, et al., "Potential utilization of class C fly ash-based geopolymer in oil well cementing operations", Cement & Concrete Composites 53, 2014, 10-17.
Khalifeh, et al., "Potential Utilization of Geopolymers in Plug and Abandonment Operations", SPE Bergen One Day Seminar, Bergen, Norway, 2014, 14 pages.
Miller, et al., "The Development of a Geopolymer-Based Pill as an Engineered Solution to Lost Circulation", SPE Annual Technical Conference and Exhibition, 2013, 10 pages.

* cited by examiner

*Primary Examiner* — Zakiya W Bates
(74) *Attorney, Agent, or Firm* — Meunier Carlin & Curfman LLC

(57) ABSTRACT

Provided herein are cementitious compositions comprising a non-aqueous fluid and an alkali-activated material. The non-aqueous fluid can include a natural oil, a synthetically derived oil, one or more surfactants, or a combination thereof. In some embodiments, the non-aqueous fluid can include an oil based mud, a synthetic based mud, or a mixture thereof. The alkali-activated material in the cementitious composition can be derived from an aluminosilicate material and an alkaline activator. In some embodiments, the aluminosilicate material includes fly ash. The alkaline activator can be selected from an alkali-hydroxide, an alkali-silicate, an alkali carbonate, an alkali bicarbonate, an alkali sulfate, and a mixture thereof. Provided herein are also wellbore servicing composition, such as compositions to reduce lost circulation of drilling fluids or cement a casing into the borehole, comprising the cementitious compositions and methods for preparing and using the cementitious compositions.

22 Claims, No Drawings

CEMENTITIOUS COMPOSITIONS COMPRISING A NON-AQUEOUS FLUID AND AN ALKALI-ACTIVATED MATERIAL

FIELD

This disclosure relates generally to cementitious compositions, in particular to cementitious compositions comprising a non-aqueous fluid and an alkali-activated material.

BACKGROUND

The general procedure of drilling an oil or gas well includes drilling a borehole using a drilling fluid. The use of an organic based drilling fluid or drilling mud such as an oil based drilling fluid (also known as oil based mud) or a synthetic based drilling fluid (also known as synthetic based mud), has become increasingly popular since their introduction in the 1950's. Oil based muds and synthetic based muds offer advantages over water based muds in many drilling situations. In particular, oil based muds are known in the art to provide excellent clay stabilization and shale inhibition, borehole stability, lubricity, thermal stability, corrosion inhibition, tolerance of contamination, and ease of maintenance.

Subsequent to drilling the borehole, casing is run into the well and a cement slurry is then placed in the annulus between the outside of the casing and the borehole wall. In order to obtain a good cementing job, it is necessary for the cement slurry to displace substantially all of the drilling mud from the annulus. Once placed, the purpose of the cement slurry is to harden in the annulus and provide an effective seal between the casing and the borehole. The hardened cement sheath prevents or inhibits communication of fluids between the various formations penetrated by the well. In addition to providing zonal isolation, the cement is in contact with the casing and provides mechanical support and resistance to axial movement through the shear bond developed between the interfaces of cement and pipe and cement and formation. However, bonding between the cement and casing and borehole surfaces is not always readily achievable, especially where the drilling fluid and cement are not compatible, which is not uncommon. In particular, the oil wetting nature of organic based drilling muds causes incompatibilities with traditional Portland cements in downhole environments. This incompatibility can lead to loss of cement sheath integrity as well as ingress of formation fluids, which then compromises zonal isolation.

During the drilling process, the drilling fluid must stay in the borehole to perform its function(s). Frequently, undesirable formation conditions are encountered in which substantial amounts or, in some cases, practically all of the drilling fluid may be lost to the formation, also known as lost circulation, which can interfere with drilling progress. Drilling fluid can leave the borehole through large or small fissures or fractures in the formation or through pores in the rock matrix surrounding the borehole. The response to such fluid losses is to pump lost circulation materials to stop and remediate the losses. However, due to incompatibilities with organic based drilling fluids, poor bonding to the surfaces of the fracture, or hardening of the cement with too high a compressive strength that will deflect the drillbit when the loss zone is re-drilled, cements known in the art often does not provide a solution for this purpose.

U.S. Pat. No. 5,058,679 describes solidification of water based drilling muds using blast furnace slag. However, a similar process was not successful with organic based drilling muds. With the nearly exclusive use of organic based drilling muds particularly in offshore operations, a different method of mud solidification is needed. The compositions and methods described herein address these and other needs.

SUMMARY

Disclosed herein are cementitious compositions. The cementitious compositions can include a non-aqueous fluid and an alkali-activated material. In some embodiments, the non-aqueous fluid can include a natural oil, a synthetically derived oil, one or more surfactants, or a combination thereof. In some examples, the non-aqueous fluid can include an organic based mud such as an oil based mud, a synthetic based mud, or combinations thereof. Organic based as used herein include both natural and synthetically derived organic based muds. In some embodiments, the organic based mud can include an oil based mud, a synthetic based mud, or mixtures thereof. The non-aqueous fluid can be present in an amount of from about 0.1% to about 60% by volume, such as from about 0.1% to about 40% by volume, based on the total volume of the cementitious composition.

The cementitious composition includes an alkali-activated material. The term "alkali-activated material" is meant to be limiting. In some embodiments, the alkali-activated material can be derived from alkaline activation of a precursor material with an alkaline activator. Alkaline activation can involve a reaction between the precursor material with alkalis and/or alkaline-earth elements in a caustic environment. In some embodiments, the alkali-activated material includes an alkali-activated aluminosilicate material. In some examples, the alkali-activated material can include a geopolymer. Suitable aluminosilicate materials for use in the cementitious composition can include fly ash (e.g. Class F fly ash or Class C fly ash), bottom ash, paper ash, a basaltic rock, an andesitic rock, a feldspar, an aluminosilicate clay, bauxite, an obsidian, a volcanic rock, a volcanic glass, a blast furnace slag, an industrial slag, an industrial incineration ash, a sludge, soil, a waste material, a pozzolanic material, or a combination thereof. In some embodiments, the aluminosilicate material includes fly ash. The alkaline activator can include an alkali-hydroxide, an alkali-silicate, an alkali-carbonate, an alkali-bicarbonate, an alkali-sulfate, or a mixture thereof. In some embodiments, the alkaline activator includes a cation selected from an alkali metal or an alkaline earth metal such as sodium, potassium, lithium, cesium, rubidium, calcium, or a combination thereof. The alkali-activated material can be present in the cementitious composition in an amount of from about 40% to about 99.9% by volume, based on the total volume of the cementitious composition.

The cementitious composition can further include a silica nanoparticle, Portland cement, silica fume, a dispersant, a surfactant, an aggregate, an accelerator, a retarder, a fluid loss additive, or a combination thereof.

The cementitious composition can have a compressive strength of from about 50 psi to about 20,000 psi such as from about 500 psi to about 20,000 psi, from about 500 psi to about 10,000 psi, or from about 1,000 psi to about 10,000 psi.

Wellbore servicing compositions comprising a cementitious composition as described herein are also disclosed. In some embodiments, the wellbore servicing composition can include 60% or less by volume, of an organic based mud. In some embodiments, the wellbore servicing composition retains at least 50% compressive strength when placed in a subterranean formation, compared to the compressive strength of the alkali-activated material alone.

Methods for preparing the cementitious compositions and the wellbore servicing compositions are disclosed. The method for preparing the cementitious composition can include mixing an aluminosilicate material, an alkaline activator, and a non-aqueous fluid to form the cementitious composition. In some embodiments, the alkaline activator is in the form of a solution, wherein the solution comprises from 0.01% by weight to saturation, of the alkaline activator. The cementitious composition can have a pumpable viscosity. In some embodiments, the viscosity of the cementitious composition can be 1000 cp or less. The method for preparing the cementitious compositions can include a step of allowing the cementitious composition to solidify. The solidified cementitious composition can develop a compressive strength of from about 50 psi to about 20,000 psi.

The methods for preparing a wellbore servicing composition can include (a) mixing an aluminosilicate material and an alkaline activator with a non-aqueous fluid to form a slurry; (b) displacing the slurry to a preselected location in the borehole; and (c) allowing the slurry to solidify in-situ. The slurry can be solidified at an elevated temperature. In some embodiments, the method does not include preflushing the borehole prior to step (b) displacing the slurry to a preselected location in the borehole.

Methods for recycling an organic based drilling mud are also disclosed.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION

Disclosed herein are compositions comprising a non-aqueous fluid and an alkali-activated material. Methods of making and using the compositions are also disclosed.

The term "non-aqueous" as used herein, includes a hydrocarbon based fluid. The non-aqueous fluid can include a natural oil, synthetically derived oil, or combinations thereof. In some examples, the non-aqueous fluid includes an alpha olefin, internal olefin, ester, diester of carbonic acid, paraffin, kerosene oil, diesel oil, petroleum oil, mineral oil, vegetable oil such as rape seed oil and cotton seed oil, animal oil such as fish oil, or a combination thereof.

In some aspects, the non-aqueous fluid includes a heterogeneous fluid in which the continuous liquid phase is a hydrocarbon liquid. For example, the non-aqueous fluid can include a drilling fluid. In some embodiments, the non-aqueous fluid can include a natural oil based drilling mud, synthetic based drilling mud, or an emulsion. Where the non-aqueous fluid includes a heterogeneous fluid, one of skill in the art would understand that an aqueous fluid can be present. For example, in organic based drilling muds, an aqueous fluid can be present through natural addition from a penetrated formation or by deliberate addition. In some embodiments, the non-aqueous fluid can contain an aqueous fluid such as tap water, fresh water, sea water, naturally-occurring brine, a chloride-based brine, a bromide-based brine, a formate-based brine, additives such as barium sulfate (barite), bentonite, low and medium yield clays, salt water clay, iron oxide, calcium carbonate, starch, carboxymethylcellulose, acrylonitrile, natural gum, molecularly dehydrated phosphate, tannin compounds, quebracho, mined lignins, lignosulfonate, mica, sugar cane fibers, granular materials, or a mixture thereof. In some embodiments, the non-aqueous fluid can be in the form of an emulsion, such as a water-in-oil type emulsion, also known as invert emulsions.

Examples of commercially available non-aqueous fluids include organic fluids available under the tradenames SYNTHETIC B®, RHELIANT®, RHELIANT PLUS® from MI Swaco, RHEO-LOGIC® from Baker Hughes, PETROFREE® LE, INVERMUL® RF available from Baroid Drilling Fluids, and ESCAID® 110 available from EXXONMOBIL Corp.

The amount of non-aqueous fluid used in the cementitious compositions described herein may vary depending upon application. In some embodiments, the non-aqueous fluid can be in an amount of about 0.1% or greater by volume, based on the total volume of the cementitious composition. In some embodiments, the non-aqueous fluid can be in an amount of about 1% or greater, about 2% or greater, about 5% or greater, about 8% or greater, about 10% or greater, about 15% or greater, about 20% or greater, about 25% or greater, about 30% or greater, about 35% or greater, about 40% or greater, about 45% or greater, about 50% or greater, or about 55% or greater by volume, based on the total volume of the cementitious composition. In some embodiments, the non-aqueous fluid can be in an amount of about 60% or less, about 55% or less, about 50% or less, about 45% or less, about 40% or less, about 35% or less, about 30% or less, about 25% or less, about 20% or less, about 18% or less, about 15% or less, about 12% or less, about 10% or less, about 9% or less, about 8% or less, about 7% or less, about 6% or less, or about 5% or less by volume, based on the total volume of the cementitious composition. In some embodiments, the non-aqueous fluid can be in an amount of from about 0.1% to about 60%, about 0.1% to about 40%, about 0.1% to about 20%, about 5% to about 60%, about 5% to about 50%, about 5% to about 40%, about 10% to about 60%, about 10% to about 50%, or about 10% to about 40% by volume, based on the total volume of the cementitious composition.

The cementitious compositions described herein include an alkali-activated material. In some aspects, the alkali-activated material can be derived from reacting a precursor material (such as a geological based source material) and an alkaline liquid (also referred to herein as an "alkaline activator"). In some embodiments, the precursor material includes aluminosilicate. In some examples, the precursor material can include fly ash (e.g. Class F fly ash or Class C fly ash), bottom ash, paper ash, basaltic rock, andesitic rock, feldspar, an aluminosilicate clay (e.g. kaolinite clay, illite clay, bedalite clay, bentonite clay, china, or fire clays), bauxite, obsidian, volcanic ash, a volcanic rock, a volcanic glass, blast-furnace slag, an industrial incineration ash, a sludge, soil, a waste material, a pozzolanic material, or a combination thereof. In some embodiments, the precursor material includes fly ash. The precursor material can be calcined or uncalcined.

The precursor material can be in the form of a powder. In some embodiments, the precursor material can have an average particle size of from about 0.01 to about 300 μm, such as from about 0.05 to about 50 μm, from about 0.1 to about 25 μm, or from about 0.2 to about 10 μm. The particle size may be achieved by appropriate grinding and classification. In some examples, the particle size of the precursor material can be achieved by ball milling (wet and dry), high energy centrifugal milling, jet milling, or attrition milling.

The alkaline activator can include those alkaline activators commonly used in the field of geopolymer concrete production. In some embodiments, the alkaline activator can include an alkaline hydroxide activator, an alkaline silicate activator, an alkaline bicarbonate activator, an alkaline carbonate activator, an alkaline sulfate activator, or a mixture thereof. In some embodiments, the alkaline activator can include an alkali metal or alkaline earth metal such as a cation selected from sodium, potassium, lithium, cesium, rubidium, calcium, or a combination thereof. Specific examples of alkaline activators that can be used to form the alkali-activated material include sodium hydroxide, potassium hydroxide, calcium hydroxide, magnesium hydroxide, other earth metal hydroxide, sodium silicate, potassium silicate, sodium carbonate, zinc carbonate, titanium carbonate, other alkaline solutions, or a mixture thereof. The alkaline activator can be in the form of a solution. In some embodiments, the solution includes from about 0.01% by weight to saturation, of the alkaline activator. For example, where the alkaline activator is sodium hydroxide, the solution can include from about 0.01% to about 52.6% by weight, of sodium hydroxide at room temperature.

The amount of alkali-activated material in the cementitious compositions described herein can vary depending upon application. In some embodiments, the alkali-activated material can be in an amount of about 40% or greater by volume, based on the total volume of the cementitious composition. In some embodiments, the alkali-activated material can be in an amount of about 45% or greater, about 50% or greater, about 55% or greater, about 60% or greater, about 65% or greater, about 70% or greater, about 75% or greater, about 80% or greater, about 85% or greater, about 90% or greater, or about 95% or greater by volume, based on the total volume of the cementitious composition. In some embodiments, the alkali-activated material can be in an amount of about 99.9% or less, about 99% or less, about 95% or less, about 90% or less, about 85% or less, about 80% or less, about 75% or less, about 70% or less, about 65% or less, about 60% or less, about 55% or less, about 50% or less, or about 45% or less by volume, based on the total volume of the cementitious composition. In some embodiments, the alkali-activated material can be in an amount of from about 40% to about 99.9%, about 40% to about 99%, about 40% to about 95%, about 40% to about 90%, 4 about 0% to about 85%, about 40% to about 80%, about 50% to about 95%, about 50% to about 90%, about 50% to about 80%, or about 60% to about 80% by volume, based on the total volume of the cementitious composition.

The cementitious compositions can include additives that may improve or change the properties of the composition. Examples of such additives can include a silica nanoparticle, silica fume, a dispersant, a surfactant, an aggregate, a salt, an accelerator, a retarder, a viscosifier, a fluid loss agent, a weighting material, Portland cement, vitrified shale, a formation conditioning agent, or a combination thereof. Other additives that can be added to the cementitious composition can include carbon fibers, glass fibers, metal fibers, or minerals fibers to further modify the mechanical properties of the composition. In some embodiments, the cementitious composition can include silica nanoparticles to improve the compressive strength of the composition. The cementitious composition can include a retarder also known as an inhibitor. Inhibitors can be used to adjust the time required for setting of a slurry of the cementitious composition.

Methods of making the cementitious compositions described herein are also disclosed. The methods are not particularly limited so long as the components of the compositions are mixed and well dispersed. Generally, the components of the cementitious composition can be mixed together in any order under agitation. In some embodiments, the method of making the cementitious compositions can include mixing an aluminosilicate containing material, an alkaline activator, and a non-aqueous fluid. The components can be mixed simultaneously. Alternatively, the method can include mixing the aluminosilicate containing material and the alkaline activator to form a slurry, followed by addition of the non-aqueous fluid to form the cementitious composition. In some embodiments, the method can include mixing the aluminosilicate containing material and the non-aqueous fluid, followed by addition of the alkaline activator to form the cementitious composition. The components of the cementitious composition can be mixed using any mixing device compatible with the composition as known to one of ordinary skill in the art, for example a batch mixer or recirculating mixer.

Generally, alkali-activated material slurries (such as geopolymer slurries including the aluminosilicate containing material and the alkaline activator) have very high viscosities which may be a non-starter in oil and gas well cementing, where such slurries have to be pumped through small-diameter pipes and into narrow annular spaces over thousands of feet. If the slurry is too viscous, the pressures required to pump it can become insurmountable. In some embodiments, the viscosity of the cementitious composition comprising the aluminosilicate containing material, the alkaline activator, and the non-aqueous fluid is reduced compared to the alkali-activated material slurry alone. In some embodiments, the cementitious composition becomes 'pumpable' as it relates to oil and gas well cementing. In some embodiments, the viscosity of the cementitious composition can be about 1000 cp or less. For example, the viscosity of the cementitious composition can be about 900 cp or less, about 800 cp or less, about 700 cp or less, about 600 cp or less, about 500 cp or less, about 450 cp or less, about 400 cp or less, about 350 cp or less, about 300 cp or less, about 250 cp or less, about 200 cp or less, about 150 cp or less, about 100 cp or less, about 90 cp or less, about 80 cp or less, about 70 cp or less, about 60 cp or less, or about 50 cp or less.

The method for preparing the cementitious composition can further include allowing the cementitious composition to solidify. The setting behavior, among other properties such as the rate of strength development and ultimate compressive strength of the cementitious composition can be tailored by selecting for example, an appropriate alkali-activated material, the ratio of the alkali-activated material to the non-aqueous fluid, temperature, and particle size of the aluminosilicate containing material. Thus, the selection of the type of alkali-activated material and/or the ratio of the alkali-activated material to the non-aqueous fluid used in the cementitious compositions can be based on the balance of properties desired in the end application of the cementitious compositions.

In some embodiments, the cementitious compositions can solidify in 48 hours or less, 32 hours or less, 24 hours or less, 20 hours or less, 18 hours or less, 15 hours or less, 12 hours or less, 10 hours or less, 8 hours or less, 6 hours or less, 4 hours or less, or 2 hours or less. The cementitious compositions can develop a compressive strength of from about 50 psi or greater, about 100 psi or greater, about 200 psi or greater, about 300 psi or greater, about 400 psi or greater, about 500 psi or greater, about 600 psi or greater, about 700 psi or greater, about 800 psi or greater, about 900 psi or greater, about 1,000 psi or greater, about 1,500 psi or greater, about 2,000 psi or greater, about 2,500 psi or greater, about 3,000 psi or greater, about 3,500 psi or greater, about 4,000 psi or greater, about 4,500 psi or greater, about 5,000 psi or greater, about 6,000 psi or greater, about 7,000 psi or greater, about 8,000 psi or greater, about 9,000 psi or greater, about 10,000 psi or greater, about 11,000 psi or greater, about 12,000 psi or greater, about 15,000 psi or greater, or about 18,000 psi or greater. In some embodiments, the cementitious compositions can develop a compressive strength of from 50 psi to 20,000 psi. In some embodiments, the solidified cementitious composition can develop a compressive strength of from about 100 psi to about 10,000 psi, from about 1000 psi to about 10,000 psi, from about 2,000 psi to about 10,000 psi, or from about 1,000 psi to about 20,000 psi. In some embodiments, the cementitious composition retains at least about 50% of the compressive strength, compared to the compressive strength of the alkali-activated material alone, when used in downhole conditions. In some embodiments, the compressive strength that develops is directly proportional to the ratio of alkali-activated material to the non-aqueous fluid. In some examples, increasing the amount of alkali-activated material present in the composition can result in an increased final compressive strength of the set composition.

The composition can have a density of about 4 lb/gallon (ppg) or greater, about 5 ppg or greater, about 6 ppg or greater, about 7 ppg or greater, about 8 ppg or greater, about 9 ppg or greater, about 10 ppg or greater, about 11 ppg or greater, about 12 ppg or greater, about 13 ppg or greater, about 15 ppg or greater, about 17 ppg or greater, about 20 ppg or greater, about 22 ppg or greater, or about 25 ppg or greater. In some embodiments, the composition may have a density from about 4 lb/gallon (ppg) to about 25 ppg, from about 12 ppg to about 17 ppg, from about 6 ppg to about 14 ppg. Density reducing additives such as glass beads or foam and expanding additives such as gas, suspension aids, foaming agents, and the like may be included in the composition to generate a lightweight cement slurry. Amounts of such density-reducing additives and methods for their inclusion are known to one of ordinary skill in the art.

The cementitious composition disclosed herein may be used as a wellbore servicing fluid. As used herein, a "servicing fluid" refers to a fluid used to drill, complete, work over, fracture, repair, or in any way prepare a wellbore for the recovery of materials residing in a subterranean formation penetrated by the wellbore. It is to be understood that "subterranean formation" encompasses both areas below exposed earth and areas below earth covered by water such as ocean or fresh water. In some embodiments, servicing the wellbore includes positioning the composition in the wellbore to isolate the subterranean formation from a portion of the wellbore; to support a conduit in the wellbore; to plug a void or crack in the conduit; to plug a void or crack in a cement sheath disposed in an annulus of the wellbore; to plug an opening between the cement sheath and the conduit; to prevent the loss of aqueous or non-aqueous drilling fluids into loss circulation zones such as a void, vugular zone, or fracture; to be used as a fluid in front of cement slurry in cementing operations; to seal an annulus between the wellbore and an expandable pipe or pipe string; or combinations thereof. In some embodiments, the cementitious compositions may serve as a gravel packing fluid in gravel-packing operations. In some embodiments, the cementitious compositions may be used for plug and abandonment of a well, i.e. to prepare a well to be shut in and permanently isolated. In some embodiments, the cementitious compositions may serve as a spot fluid. A spot fluid herein refers to a small volume or pill of fluid placed in a wellbore annulus that may displace another wellbore servicing fluid such as for example a mud. The spot fluid may act as a settable fluid that when used will displace another wellbore servicing fluid from a crack or crevice in the wellbore and solidify to prevent flow of other wellbore servicing fluids into said cracks or crevices.

In some embodiments, the cementitious compositions can be used to recycle an organic based drilling fluid. Generally, the disposal of drilling fluids in an offshore environment is governed by strict environmental regulations including OSPAR Commission in the northeastern Atlantic and the Environmental Protection Agency (EPA) in the Gulf of Mexico. The disclosed methods allows for the recycling of an organic based drilling fluid as a component of the cementitious composition, with no need to transport it back to land or to dispose of it in the ocean.

In some embodiments, the composition can be used to improve the pumpability of an alkali-activated cement such as a geopolymer. Generally, geopolymer cements do not inherently have appropriate rheological properties for pumpability, and few additives have been identified to improve their rheological properties. The blending of the alkali-activated material and a non-aqueous fluid (such as an organic based drilling fluid) improves rheological properties of the alkali-activated cement, allowing for pumpability of the slurry for well cementation.

In some examples, the cementitious composition can be used to provide a hardened cement sheath between a casing and a borehole. The hardened cement sheath prevents or inhibits communication of fluids between the various formations penetrated by a well. In addition to providing zonal isolation, the cementitious composition can provide mechanical support and resistance to axial movement through the shear bond developed between the interfaces of the cement and casing and the cement and formation. As discussed herein, the oil-wetting nature of organic based drilling muds leads to incompatibilities with traditional Portland cements, and this incompatibility can lead to non-setting cement due to contamination when the mud has not been fully displaced from the hole before cementing operations. This incompatibility can also lead to loss of cement sheath integrity as well as ingress of formation fluids, which then compromises zonal isolation.

Methods for solidifying an organic based drilling fluid in a borehole are provided. In some embodiments, the method does not include preflushing the borehole prior to contacting the cementitious composition to the borehole. In some embodiments, the method for solidifying an organic based drilling fluid in a borehole can include (a) mixing an aluminosilicate material and an alkaline activator with the organic based drilling fluid to form a slurry; (b) displacing the slurry to a preselected location in the borehole; and (c) allowing the slurry to solidify in-situ.

The slurry can be mixed prior to placement into the borehole. In some embodiments, the step of mixing an aluminosilicate material and an alkaline activator with the organic based drilling fluid to form a slurry can include pumping the aluminosilicate material and the alkaline activator into a casing in the borehole comprising an organic based drilling fluid. Alternatively, the slurry can be formed by mixing of a first stream comprising the alkaline activator and a second stream comprising the aluminosilicate material, which is combined with an organic based drilling fluid in the borehole. The method for solidifying the organic based drilling fluid can be used to reduce lost circulation of drilling fluids, cement a casing into the borehole, or a combination thereof. In some embodiments, the step of displacing the slurry to a preselected location in the borehole can include pumping a drilling fluid behind the slurry to displace it out the bottom of the casing and up into the annulus between the casing and borehole wall. The slurry is usually raised to a point above the uppermost section of the formations to be isolated and can be raised into the annulus between the casing string being cemented and a previously cemented casing. In some embodiments, the slurry can be solidified at an elevated temperature.

The composition, when solidified, can isolate the subterranean formation from a different portion of the wellbore. The composition thus forms a barrier that prevents fluids in that subterranean formation from migrating into other subterranean formations. The compositions described herein can develop an appreciable compressive strength when placed downhole. For example, the compositions can develop a compressive strength of from 50 psi to 20,000 psi, from 100 psi to 10,000 psi, from 1000 psi to 10,000 psi, from 2,000 psi to 10,000 psi, or from 1,000 psi to 20,000 psi when placed in a subterranean formation. In some embodiments, the solidified composition can retain at least about 10%, at least about 20%, at least about 30%, at least about 40%, at least about 50%, at least about 60%, or at least about 70% of its compressive strength, compared to the compressive strength of the alkali-activated material alone, when placed in a subterranean formation. In some embodiments, the solidified composition can retain from about 10% to about 90%, from about 20% to about 70% of its compressive strength, compared to the compressive strength of the alkali-activated material alone, when placed in a subterranean formation.

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative materials and method steps disclosed herein are specifically described, other combinations of the materials and method steps also are intended to fall within the scope of the appended claims, even if not specifically recited. Thus, a combination of steps, elements, components, or constituents may be explicitly mentioned herein; however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments and are also disclosed. As used in this disclosure and in the appended claims, the singular forms "a", "an", "the", include plural referents unless the context clearly dictates otherwise.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. Unless stated to the contrary "about" a particular value means within 5% of the particular value, e.g., within 2% or 1% of the particular value.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A cementitious composition, comprising: a cement, wherein the cement is formed from reaction of an aluminosilicate-based alkali-activated material and an alkaline activator selected from an alkali-hydroxide, an alkali-silicate, an alkali carbonate, an alkali bicarbonate, an alkali sulfate, and a mixture thereof in the presence of a non-aqueous fluid.

2. The cementitious composition of claim 1, wherein the non-aqueous fluid includes a natural oil, a synthetically derived oil, one or more surfactants, or a combination thereof.

3. The cementitious composition of claim 1, wherein the non-aqueous fluid is an oil based mud, a synthetic based mud, or a combination thereof.

4. The cementitious composition of claim 1, wherein the non-aqueous fluid is present in an amount of from about 0.1 to about 60% by volume, based on the total volume of the cementitious composition.

5. The cementitious composition of claim 1, wherein the aluminosilicate-based alkali-activated material is derived from fly ash, bottom ash, a paper ash, a basaltic rock, an andesitic rock, a feldspar, an aluminosilicate clay, a bauxite, an obsidian, a volcanic rock, a volcanic glass, a slag, an industrial incineration ash, a sludge, a soil, a waste material, a pozzolanic material, or a combination thereof.

6. The cementitious composition of claim 1, wherein the alkaline activator comprises a cation selected from sodium, potassium, lithium, cesium, rubidium, and a combination thereof.

7. The cementitious composition of claim 1, wherein the aluminosilicate-based alkali-activated material is present in an amount of from about 40% to about 99.9% by volume, based on the total volume of the cementitious composition.

8. The cementitious composition of claim 1, wherein the composition further comprises a silica nanoparticle, silica fume, a dispersant, a surfactant, an aggregate, an accelerator, a retarder, a fluid loss additive, or a combination thereof.

9. The cementitious composition of claim 1, wherein the composition has a compressive strength of from about 50 psi to about 20,000 psi.

10. A wellbore servicing composition comprising the cementitious composition of claim 1.

11. The wellbore servicing composition of claim 10, wherein the wellbore servicing composition comprises 60% or less by volume, of the non-aqueous fluid.

12. The wellbore servicing composition of claim 10, wherein the wellbore servicing composition retains at least 50% compressive strength, compared to the compressive strength of the alkali-activated material alone.

13. The cementitious composition of claim 1, wherein the composition does not include a surfactant.

14. A method for preparing a cementitious composition, comprising:

mixing an aluminosilicate material, an alkaline activator selected from an alkali-hydroxide, an alkali-silicate, an alkali carbonate, an alkali bicarbonate, an alkali sulfate, and a mixture thereof, and a non-aqueous fluid to form the cementitious composition.

15. The method of claim 14, wherein the cementitious composition has a viscosity of 1000 cp or less.

16. The method of claim 14, wherein the method does not include adding a surfactant.

17. A method for solidifying a drilling fluid in a borehole, comprising:

a. mixing an aluminosilicate material, an alkaline activator selected from an alkali-hydroxide, an alkali-silicate, an alkali carbonate, an alkali bicarbonate, an alkali sulfate, or a mixture thereof, and an organic based drilling fluid to form a slurry;

b. displacing the slurry to a preselected location in the borehole; and c. allowing the slurry to solidify in-situ by reaction of the aluminosilicate material and the alkaline activator.

18. The method of claim 17, wherein the slurry is solidified at an elevated temperature.

19. The method of claim 17, wherein the slurry comprises 60% or less by volume, of the organic based drilling fluid.

20. The method of claim 17, wherein the method does not include preflushing the borehole.

21. The method of claim 17, wherein the method reduces lost circulation of drilling fluids, cement a casing into the borehole, or a combination thereof.

22. The method of claim 17, wherein the method does not include adding a surfactant.

* * * * *